(12) United States Patent
Hawkins et al.

(10) Patent No.: US 11,685,316 B2
(45) Date of Patent: *Jun. 27, 2023

(54) VEHICLE ROOF RAIL ATTACHMENT APPARATUS AND METHOD

(71) Applicant: Lacks Enterprises, Inc., Grand Rapids, MI (US)

(72) Inventors: Thomas Hawkins, Lowell, MI (US); Paul Nikandrou, Caledonia, MI (US); Brian Wojtczak, Grand Rapids, MI (US)

(73) Assignee: Lacks Enterprises, Inc., Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/717,234

(22) Filed: Apr. 11, 2022

(65) Prior Publication Data
US 2022/0234510 A1 Jul. 28, 2022

Related U.S. Application Data

(63) Continuation of application No. 16/529,033, filed on Aug. 1, 2019, now Pat. No. 11,299,103.

(60) Provisional application No. 62/713,193, filed on Aug. 1, 2018.

(51) Int. Cl.
*B60R 9/04* (2006.01)

(52) U.S. Cl.
CPC .................................. *B60R 9/04* (2013.01)

(58) Field of Classification Search
CPC ............ B60R 9/04; B60R 9/052; B60R 9/058
See application file for complete search history.

(56) References Cited

U.S. PATENT DOCUMENTS

| | | | |
|---|---|---|---|
| 4,279,368 A | 7/1981 | Kowalski | |
| 4,426,028 A | 1/1984 | Bott | |
| 10,464,494 B2 | 11/2019 | Chen et al. | |
| 2012/0273535 A1* | 11/2012 | Aftanas | B60R 9/045 224/309 |
| 2013/0048690 A1 | 2/2013 | Aftanas et al. | |
| 2020/0139901 A1 | 5/2020 | Kowal et al. | |
| 2021/0245668 A1 | 8/2021 | Tertuliani et al. | |

* cited by examiner

*Primary Examiner* — Corey N Skurdal
(74) *Attorney, Agent, or Firm* — Dickinson Wright PLLC

(57) ABSTRACT

A roof rail and an apparatus for attaching the roof rail to the roof of a vehicle are provided. The roof rail is elongated and includes a bottom portion for engaging the outer surface of the roof. The roof rail also includes inboard and outboard side portions extending between the bottom portion and a top portion. An access hole is provided in the roof rail on an inboard side portion or at a location that is lower than an uppermost point of the roof rail for providing access to a fastener such as a roof stud or bolt attaching the roof rail to the roof. The access hole is blocked from view from a laterally outer side of the roof rail.

23 Claims, 3 Drawing Sheets

VEHICLE ROOF RAIL ATTACHMENT APPARATUS AND METHOD

CROSS-REFERENCE TO RELATED APPLICATIONS

This application is a continuation of U.S. patent application Ser. No. 16/529,033, filed Aug. 1, 2019, which claims the benefit of previously filed U.S. Provisional Patent Application No. 62/713,193, filed Aug. 1, 2018, both of which are hereby incorporated by reference in their entirety.

BACKGROUND OF THE INVENTION

1. Field of the Invention

An attachment apparatus for fastening a roof rail to the roof of a vehicle is provided.

2. Discussion

The automotive industry is increasingly interested in providing roof rails for vehicles, which may also be called luggage rails, which are securely attached to the vehicle roof while maintaining a clean attractive appearance.

Roof rails may make up an overall roof rack assembly, in which a pair of rails extend along respective outer sides of the vehicle upper surface or roof surface. The rails are typically spaced apart symmetrically relative to a vehicle center-line extending in the fore-and-aft direction. The rails may be oriented in a generally parallel relationship, such that the front ends of the rails are spaced apart at approximately the same distance as the rear ends of the rails. In some cases, transverse or cross-wise support rails may extend laterally between the roof rails to provide a mounting surface for luggage or other roof-carried components. In other cases, the rails may be configured to support consumer-installed support rails or other structure.

Rails may be installed in either a top-down or bottom-up approach to the vehicle roof. In a bottom-up approach, studs projecting downward from the roof rail extend through a hole in the vehicle roof, and an installer may thread a nut, or the like, on the stud that projects downward through the sheet metal. In a top-down approach, installation of the roof rail is achieved by threading a nut onto an upwardly projecting stud that extends from the vehicle roof, or by driving a bolt downward through a hole in a vehicle roof and into a weld nut disposed on an inside surface of the vehicle roof.

Thus, in a bottom-up approach, the installer is positioned below the vehicle roof to translate a fastener upward, and in the top-down approach, the installer is positioned above the vehicle roof to translate a fastener downward. In the bottom-up approach, the hole in the vehicle roof can lead to water leaks, which need to be addressed. In the top-down approach when there is a hole in the vehicle roof, there is also a concern for water leaks. The top-down approaches also typically result in studs or holes in the roof rail that are visible prior to installation of a decorative cover.

In view of the above, improvements can be made to roof rails and the installation thereof.

SUMMARY OF THE INVENTION

It would be advantageous to provide an attachment apparatus for fastening a roof rail to the roof of a vehicle while providing clean styling with no visible interruptions.

The present disclosure provides for a roof rail for a roof of a vehicle including a bottom portion for engaging the roof, a top portion opposite the bottom portion, and inboard and outboard side portions each extending between the top portion and the bottom portion and spaced apart and extending generally parallel to one another in a longitudinal direction. The bottom portion and the top portion and the inboard side portion and the outboard side portion together define an elongated shape enclosing an interior space of the roof rail. An access hole provides access to the interior space for attaching the roof rail to the roof of the vehicle. The access hole is located lower than an uppermost point of the roof rail and inboard relative to the outboard side portion.

In accordance with an aspect of the disclosure, the bottom portion of the roof rail may have a shape that is complementary with a corresponding portion of the roof. In accordance with another aspect of the disclosure, the inboard side portion may be generally transverse to the bottom portion.

In accordance with another aspect of the disclosure, the roof rail may further include a cover for enclosing the access hole. The cover may be removable from the access hole. In accordance with a further aspect, the cover may be attached to the inboard side portion of the roof rail with a hinged connection to move between covering and uncovering positions. In accordance with a further aspect, the cover may include a living hinge.

In accordance with another aspect of the disclosure, a clip having a generally U-shape may be included for holding the roof rail upon a roof stud or bolt. The clip may have a wedge shape being thickest at a first end and tapering to a thinner second end, with the second end defining a notch for receiving the bolt or roof stud.

In accordance with another aspect of the disclosure, an attachment apparatus for attaching a roof rail to a roof of a vehicle is provided. The attachment apparatus may include the roof rail having a bottom portion for engaging the roof, and a top portion opposite the bottom portion, and inboard and outboard side portions each extending between the top portion and the bottom portion and spaced apart from one another, with the bottom and top portions and the inboard and outboard side portions defining an elongated shape enclosing an interior space of the roof rail. An access hole is defined in the roof rail to provide access to the interior space for attaching the roof rail to the roof of the vehicle. The access hole is located lower than an uppermost point of the roof rail and inboard relative to the outboard side surface. A fastener may also be included for attaching the roof rail to the roof of the vehicle, with the fastener being accessible through the access hole.

In accordance with another aspect of the disclosure, the fastener may include a roof stud extending generally upwardly from the roof of the vehicle. In accordance with another aspect of the disclosure, the fastener may include a bolt extending generally downwardly to the roof of the vehicle.

In accordance with another aspect of the disclosure, the fastener may extend generally transversely to the roof of the vehicle. Alternatively or additionally, the fastener may extend at an oblique angle to the roof of the vehicle.

In accordance with another aspect of the disclosure, the roof of the vehicle may define a pocket configured to receive a portion of the roof rail. In accordance with another aspect, the roof of the vehicle may define a pocket configured for holding a portion of the fastener.

In accordance with another aspect of the disclosure, a clip having a generally U-shape may be included for holding the fastener.

3

BRIEF DESCRIPTION OF THE DRAWINGS

Other aspects of the present invention will be readily appreciated, as the same becomes better understood by reference to the following detailed description when considered in connection with the accompanying drawings wherein.

DESCRIPTION OF THE ENABLING EMBODIMENTS

Referring to the Figures, wherein like numerals indicate corresponding parts throughout the several views, a roof rail 20 is provided for attachment to a roof 10 of a vehicle. It will be appreciated that the roof rail 20 can be utilized on any type of vehicle. It will also be appreciated that it can be employed on other structures as well. Typically, a roof rack assembly includes a pair of roof rails 20, which may also be called luggage rails, which extend longitudinally along respective sides of the roof 20 in spaced and relatively parallel relationship with one another.

Figure 1:
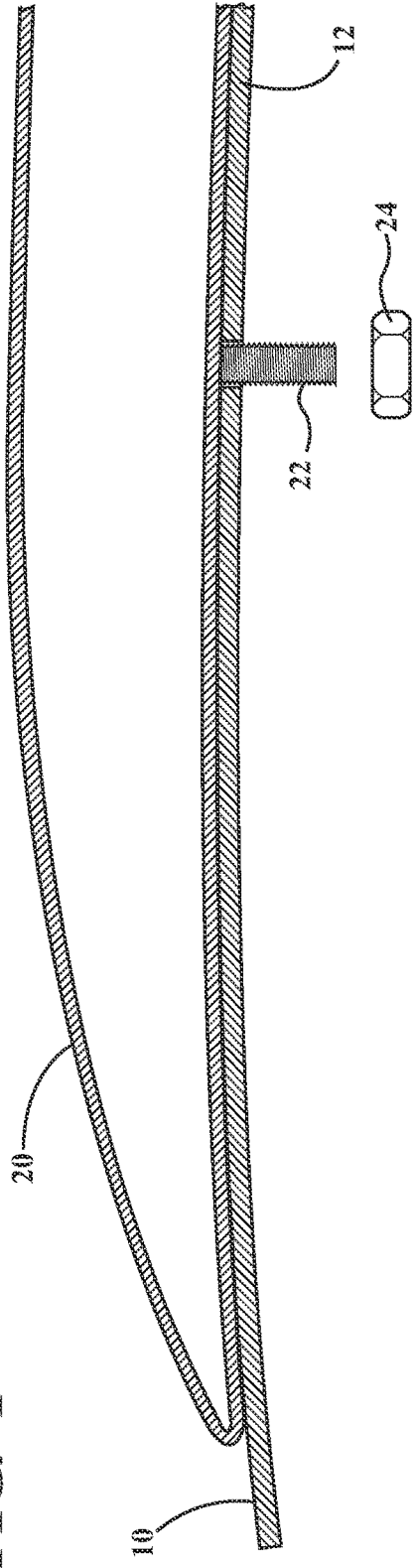
FIG. 1 is a schematic cut-away view of a "bottom-up" arrangement for attaching a roof rail to a vehicle roof according to an aspect of the present disclosure.

As shown in FIG. 1, one approach to attaching a roof rail 20 to a roof 10 of a vehicle may be configured as a so-called "bottom-up" arrangement in which a stud 22 is fixed to the roof rail 20 and protrudes downwardly through a hole in a sheet metal 12 part of the roof 10. A nut 24 is threaded onto the stud 22 from inside of the vehicle in order to attach the roof rail 20 to the roof 10. This approach is typically used for roof rails 20 of stretch bent aluminum, and allows for a roof rail styling surface with no interruptions such as cap holes, caps, etc. This approach requires holes in the sheet metal 12 in order to access the studs 22 from the inside of the vehicle. The presence of holes in the sheet metal 12 may create a risk for water leaks.

Figure 3:
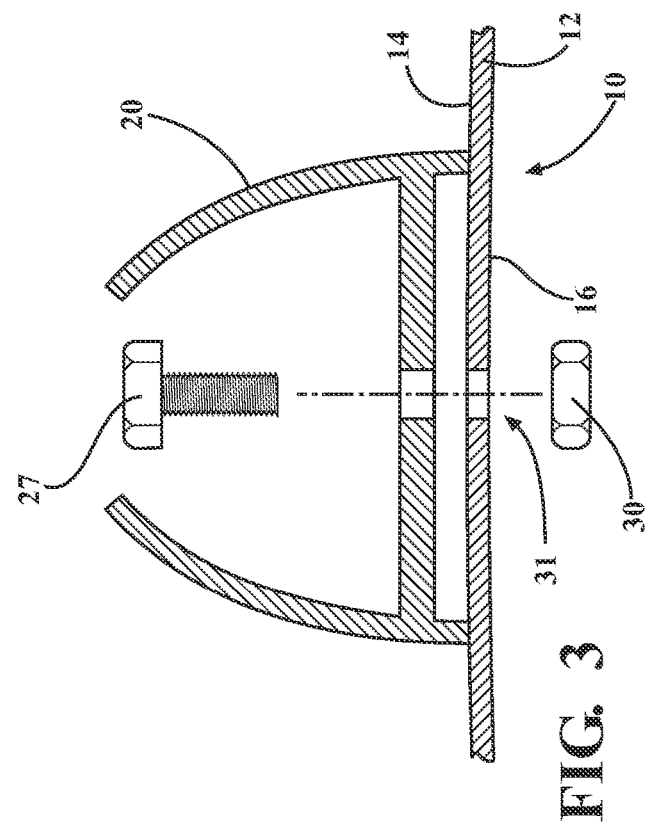
FIG. 3 is a schematic cut-away view of another "top-down" arrangement for attaching a roof rail to a vehicle roof according to an aspect of the present disclosure.
Figure 2:
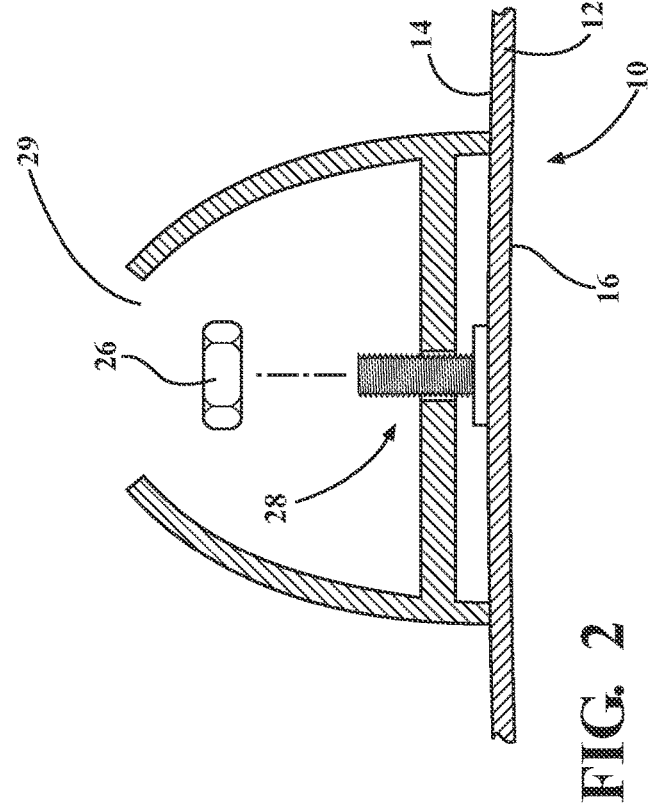
FIG. 2 is a schematic cut-away view of a "top-down" arrangement for attaching a roof rail to a vehicle roof according to an aspect of the present disclosure.

As shown in FIGS. 2-3, an alternative approach to attaching a roof rail 20 to a roof 10 of a vehicle may be configured as a so-called "top-down" arrangement. One such top-down arrangement is illustrated in FIG. 2, in which a nut 26 is threaded onto a roof stud 28 that is mounted on an outer surface 14 of the sheet metal 12 of the roof 10. The roof stud 28 may protrude upwardly through a hole in a lower portion of the roof rail 20. The roof rail 20 may therefore be secured onto the roof 10 by downward force of the nut 26 engaging a portion of the roof rail 20 around the roof stud 28 to clamp the roof rail 20 onto the roof stud 28. The roof stud 28 may be secured to the sheet metal 12, for example, by welding.

4

The roof stud 28 is shown in FIG. 2 as being located on an outer surface 14 of the sheet metal 12. In this approach, there is no hole in the sheet metal 12 of the vehicle roof 10. However, to access the stud 28 that projects upward, the roof rail 20 includes an opening 29, hole, or the like to provide access for the nut 26 to be inserted through the structure of the roof rail 20 onto the stud 28.

In an approach similar to that shown in FIG. 2, the roof stud 28 could also be secured to the inner surface 16 of the sheet metal 12, for example with a generally flat portion parallel to the sheet metal 12 and with a rod-shaped portion extending upwardly through a hole in the sheet metal 12. In this approach, the sheet metal 12 includes a hole, similar to the bottom-up approach. The roof rail 20 also includes a hole or opening to provide access for the nut 26 to be inserted through the roof rail 20 into engagement with the upwardly extending stud 28.

Another top-down arrangement is illustrated in FIG. 3, in which a bolt 27 is threaded onto a weld nut 30 that is secured to the sheet metal 12 of the roof 10. In this arrangement, the bolt 27 may extend through a hole in a lower portion of the roof rail 20 and may engage a portion of the roof rail 20 around the hole in the lower portion to secure the roof rail 20 onto the roof 10. The weld nut 30 may be, for example, welded onto the sheet metal 12. The weld nut 30 is shown as being located on an inner surface 16 of the sheet metal 12, opposite the roof rail 20. However, the weld nut 30 could also be located on the outer surface 14 of the sheet metal 12, similar to the placement of the roof stud 28 in FIG. 2. In these arrangements, the sheet metal 12 includes a hole 31, either to allow the bolt 27 to extend through the sheet metal 12 and into the weld nut 30 disposed on the inner surface of the sheet metal 12 or to allow the shank of the bolt 27 to extend through the weld nut 30 disposed on the upper surface of the sheet metal 12 after the bolt 30 has passed through the weld nut 30.

Each of the two "top-down" arrangements shown in FIGS. 2 and 3, respectively, may be used with composite type roof rails 20 which include a structural base rail and a decorative cover that overlies all or part of the structural base rail and prevents the nuts 26, bolts 27, studs 28, weld nuts 30, and/or holes from being visible once the roof rail 20 is assembled to the vehicle. In the case of the "top-down" approach where there is a hole in the sheet metal 12, there may be a concern for water leaks. In the case of a "top-down" approach, stretch-bent aluminum roof rails 20 require holes in the top styling surface in order to access the weld nut 30 or roof stud 28 below.

Figure 5:
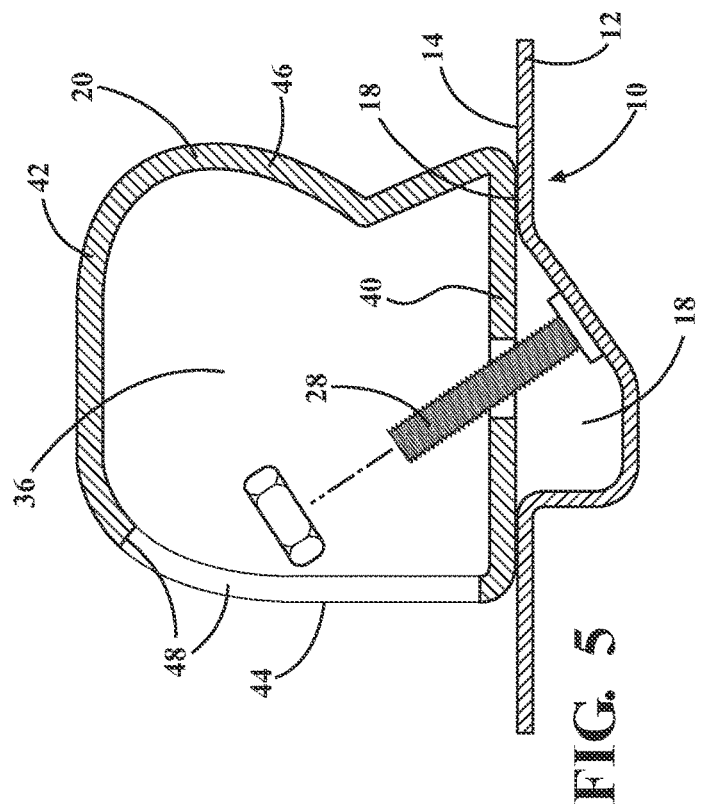
FIG. 5 is a cut-away end view of a roof rail attachment according to another aspect of the present disclosure.
Figure 4:
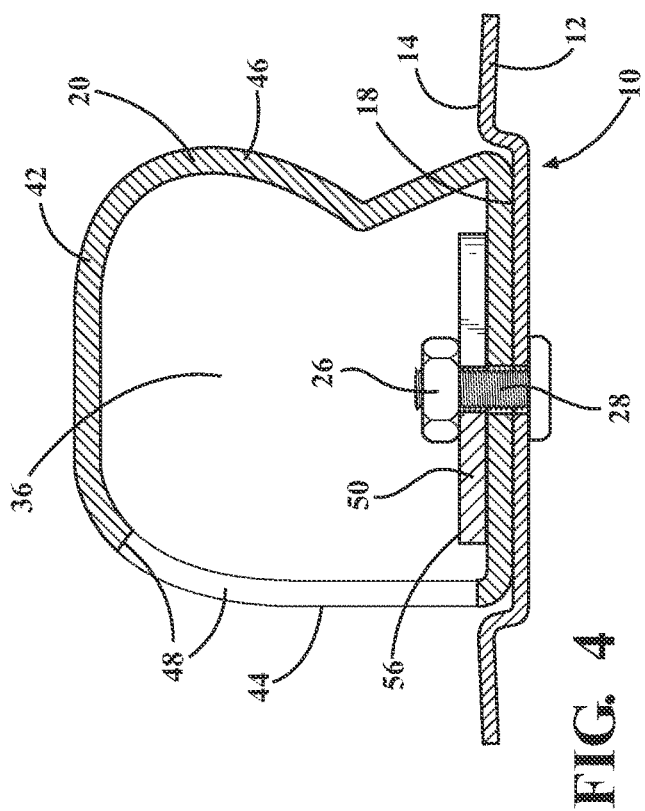
FIG. 4 is a cut-away end view of a roof rail attachment according to another aspect of the present disclosure.
Figure 6:
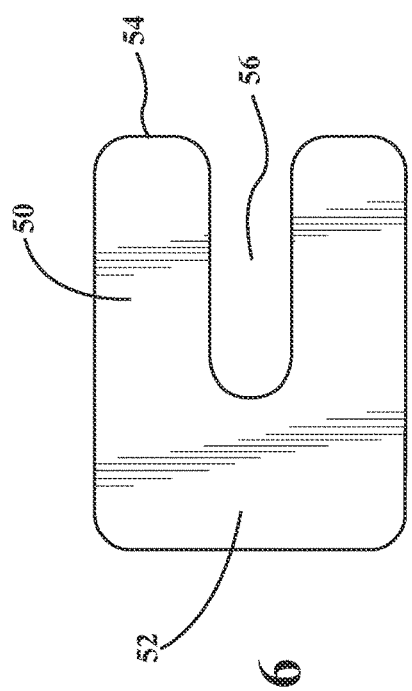
FIG. 6 is a perspective view of according to another aspect of the present disclosure.

FIGS. 4-6 illustrate alternative top-down installation approaches where the styling surface remains undisturbed, there are no holes in the sheet metal 12 or water leaks to be concerned about, and which minimize the number of roof rail components. For example, the composite design including a structural base and decorative cover may be replaced with a one-piece design, even in a top-down installation method.

According to an aspect, a roof rail 20 in accordance with the present disclosure is illustrated in the cut-away cross-sectional view of FIG. 4. It will be appreciated that the cut-away cross-sectional view may represent various longitudinal locations along the roof rail 20. According to an aspect, the roof rail 20 shown in FIG. 4 has an elongated shape. The roof rail 20 may also have other shapes and configurations. The roof rail 20 may be generally tubular and may be formed, for example, as an extrusion of metal or plastic or another material. Alternatively, the roof rail 20 may have a C-shaped cross-section which may be formed, for example, by bending a flat piece of sheet metal. These are merely illustrative examples, and other shapes or configurations of the roof rail 20 are possible. The roof rail 20 may comprise a single piece or an assembly of two or more pieces. The roof rail 20 includes a bottom portion 40 which may be shaped complementary to a corresponding portion of the outer surface 14 of the roof 10 for being secured directly thereupon. Alternatively, the bottom portion 40 of the roof rail 20 may have a shape that is different from the outer surface 14 of the roof 10, for example, where the roof rail 20 is to be spaced apart from the roof 10 with risers or other structural components. The bottom portion 40 of the roof rail 20 may be generally flat or another shape such as, for example, being convex, concave, or with a complex curve or angular shape.

The outer surface 14 of the roof 10 may define a recess or pocket 18 for receiving the roof rail 20 and holding the roof rail in a set position. The recess or pocket 18 may run for the entire length of the roof rail 20. Alternatively, the recess or pocket may extend for a length shorter than the entire length of the roof rail 20 and may receive only a portion of the roof rail 20. In another aspect, the roof rail 20 may be flush mounted to the surface of the roof 10, such that no recess is disposed below the roof rail 20.

As also shown in FIGS. 4 and 5, the roof rail 20 can also include a top portion 42 opposite the bottom portion 40, and which may be flat, rounded, or have another shape or profile. An inboard side portion 44 and an outboard side portion 46 extend between the bottom portion 40 and the top portion 42. With the roof rail 20 mounted upon the vehicle, the inboard side portion 44 faces away from the edge of the roof 10 closest to that roof rail 20. Where there are two roof rails 20 mounted the roof 10 and extending parallel to one another, the inboard side portion 44 of each of the roof rails 20 faces the other one of the roof rails 20. The inboard side portion 44 is, therefore, the side of the roof rail 20 that is most obstructed or least visible to a person viewing the vehicle from the side and/or from above.

Figure 9:
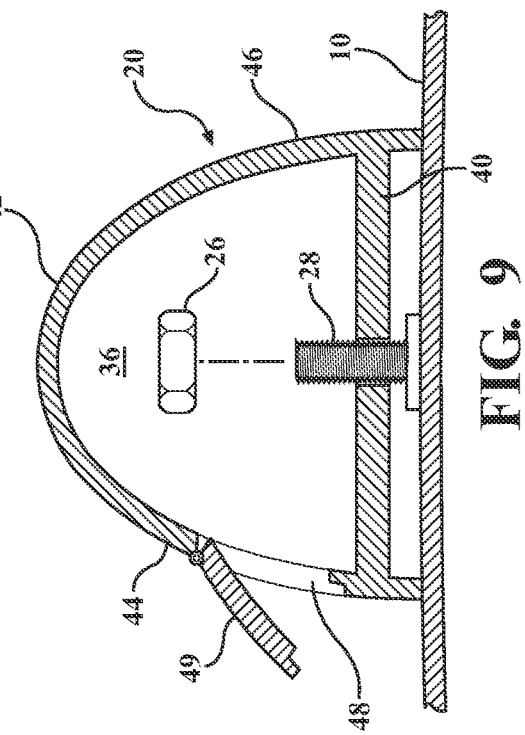
FIG. 9 is a cut-away end view of a roof rail attachment according to another aspect of the present disclosure.

FIG. 9 illustrates an alternative cross-sectional shape of the roof rail 20, having a generally curved top portion 42, with the bottom portion 40 flush mounted to the vehicle roof 10. The roof rail 20 of FIG. 9 may be attached in a manner similar to that shown in FIG. 4, as further described below.

As shown in FIGS. 4 and 5, the inboard side portion 44 of the roof rail 20 defines an access hole 48 to provide access to an interior space 36 of the roof rail 20. The interior space 36 is configured to accommodate and provide access to a fastener such as a roof stud or bolt attaching the roof rail 20 to the roof 10 of the vehicle. The access hole 48 may be covered by a removable or hinged cover 49 that is removable or pivotable away from the roof rail 20. For example, the cover 49 may be a snap-fit member that corresponds to the shape of the access hole 48, or it may be a peel-away member. An example of the cover 49, shown as a hinged cover, is shown in FIG. 9.

With respect to the hinged cover 49, the access hole 48 may be covered by the hinged cover 49, which may be in the form of a flap, allowing the cover 49 to move between covering and uncovering positions. Such a hinged cover 49 may have a living hinge, which may be integrally formed with the inboard side portion 44 of the roof rail 20 or a portion thereof such as a coating or a covering. Such a living hinge may include the hinged cover 49 being integrally formed with the inboard side portion 44 of the roof rail 20, and may include a weakened portion, such as a line of thinner material where the hinged cover portion is able to bend outwardly from the remainder of the inboard side portion 44. A hinged cover or a removable cover can provide a cleaner appearance and which may also serve to prevent water or other precipitation from entering the interior space 36 of the roof rail 20. Other ways to cover the access hole 48 may also be employed. The hinged cover 49 may also be in the form of a pivotable pin-and-bushing hinge rather than a living hinge. The hinged cover 49 may include attachment structure for securing the hinged cover in the open or closed position, as desired.

With the access hole 48 disposed on the inboard side of the roof rail 20, the top-down approach provides an option for attaching the roof rail 20 in a top-down arrangement while limiting the view of the access hole 48. The stud 28 may project from the surface of the roof 10 in an upward direction, with the access hole 48 providing access to the projecting stud 28, which projects into the space 36. With the access hole 48 on the inboard side, the access hole 48 is typically not easily visible from the periphery of the vehicle. For instance, the vehicle roof 10 may be disposed above the typical eye-line of a vehicle user, such that the outboard side of the roof rail 20 is visible but the inboard side is not. When the vehicle roof 10 is below a user's eye-line, the roof rail 20 closest to the user will typically block the view of the inboard side of the opposite roof rail 20, such that the access hole 48 is blocked form view by the roof rail 20 in the foreground of the user's view.

The stud 28 is shown as projecting generally vertically in FIG. 4. The nut 26 is shown disposed over the top of the stud 28. When viewed from above, the stud 28 and nut 26 are not visible, being blocked by the upper portion 42 of the roof rail 20.

With the stud 28 projecting vertically and the nut 26 being attached from above and outside the vehicle, the stud 28 may be welded to the outer surface of the roof 10, such that there is no hole in the surface of the roof 10. Accordingly, water leaks are minimized or eliminated in this arrangement, while also providing a roof rail 20 that is aesthetically pleasing by shielding the access hole 48 from view, and without using a base-and-cover multi-piece composite construction. However, it will be appreciated that an additional cover component may still be attached to the roof rail 20 in this arrangement.

In another aspect, the top down approach may be used similar to FIG. 3 with the arrangement of the roof rail 20 similar to FIG. 4. For example, the weld nut 30 may be disposed on an inner surface of the sheet metal 12 and with a hole in the sheet metal 12. Alternatively, the weld nut 30 may be disposed on the outer surface of the sheet metal 12 with or without a hole in the sheet metal 12 to accommodate the bolt 27 (depending on the length of the bolt 27). In this arrangement, a hole in the sheet metal 12 may be present, which can be addressed with sealers or gaskets to limit water leaks. Even in the case of a hole in the sheet metal 12, the arrangement of the roof rail 20 with the access hole 48 on the inboard side 44 may provide for a top-down installation approach where the access hole 48 is shielded from view, providing an improved appearance.

According to another aspect, as shown in FIGS. 4 and 6, a clip 50 may be used to help hold the roof rail 20 upon a fastener such as the stud 28. The clip 50 may be generally U-shaped and may have a wedge-shaped cross-sectional profile as shown in FIG. 4, whereby it is thickest at a first end 52 and tapering to a thinner second end 54, with the second end 54 defining a notch 56 for receiving the stud 28 when the clip is advanced over the stud 28.

The clip may be positioned axially between the nut 26 and the base of the roof rail 20. In one approach, the nut 26 may be partially threaded onto the stud 28, and the clip 50 may then be advanced across the stud 28 and under the nut 26. The nut 26 may then be tightened further onto the stud 28, compressing the wedge-shaped clip 50. The clip 50 may therefore provide additional binding between the nut 26 and the stud 28. In another aspect, the clip 50 may have a generally flat shape or constant thickness, such that it is not wedge-shaped. In another aspect, the clip 50 may be installed prior to installing the nut 26, and may be arranged with the wedge facing laterally inward or laterally outward, or it may face forward or rearward, or other orientations rotationally therebetween.

In another aspect, as shown in FIG. 5, the outer surface 14 of the roof 10 can define a recess or pocket 18 that includes an angled portion 60 holding the roof stud 28 at an oblique angle to the roof 10 of the vehicle, which may be, for example, 45 degrees, or mid-way between being parallel and being perpendicular to the general plane of the roof 10. It will be appreciated that a variety of the oblique angles may be employed. The angled portion 60 of the recess 18 may be directed inward, such that the stud 28 projecting therefrom is directed inward. The roof rail 20 may be arranged similarly to the roof rail 20 shown in FIG. 4, such as having an access hole 48 on the inboard side. The angled projection of the stud 28 may provide additional ease of top-down installation, in which the nut 26 can be threaded onto the projecting stud 28.

Additionally, the clip 50 described above may be used in the arrangement of FIG. 5. In this arrangement, the clip 50 may be placed over the stud 28 prior to installing the nut, with the wedge-shape of the clip arranged such that the upper face of the wedge faces laterally inward (the same direction as the stud 28). Thus, the nut 26 may have a surface against which it may be secured. However, it will be appreciated that the nut 26 may also be installed without the clip 50 to secure the roof rail 20.

Figure 7:
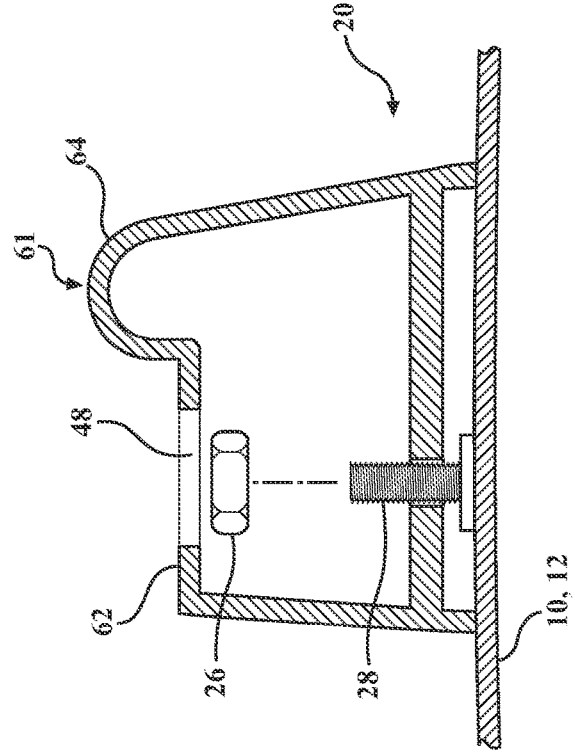
FIG. 7 is a cut-away end view of a roof rail attachment according to another aspect of the present disclosure.
Figure 8:
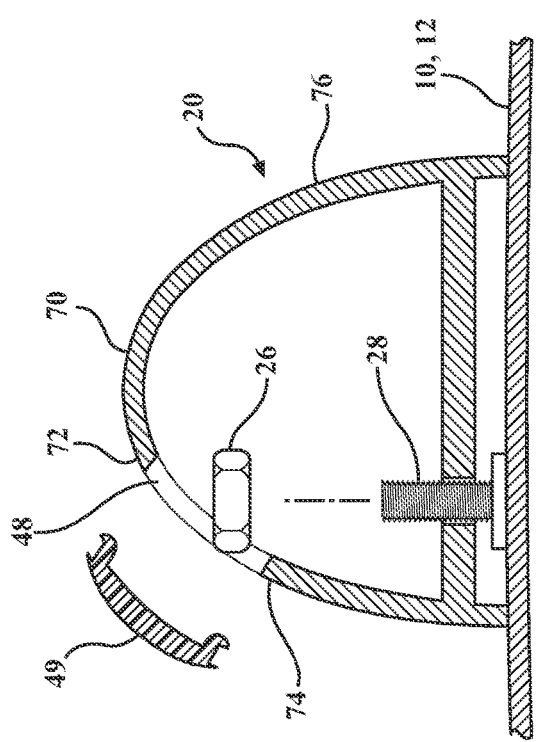
FIG. 8 is a cut-away end view of a roof rail attachment according to another aspect of the present disclosure.

In another aspect, as shown in FIGS. 7 and 8, the access hole 48 for the roof rail 20 may be disposed generally on the top side of the roof rail 20, but still generally hidden from view. With reference to FIG. 7, the roof rail 20 may include a stepped upper surface 61, with the access hole 48 defined in the stepped surface 61. The stepped surface 61 includes an inner portion 62 and an outer portion 64. The outer portion 64 is disposed above the inner portion 62. The access hole 48 is disposed in the inner portion 62.

The inner portion 62 may have a generally flat profile that faces upward. Accordingly, the access hole 48 also faces upward, and provides access for the nut 26 to be installed onto the stud 28. The stud 28 is preferably disposed below the access hole 48, such that the stud may be visible when viewed from the top of the roof rail 20.

The outer portion 64 may be raised relative to the inner portion 62. The outer portion 64 may have a generally rounded profile, as shown in FIG. 7. However, it will be appreciated that other profiles may be used in this arrangement, where the outer portion 64 is disposed higher than the inner portion 62, and the outer portion 64 may therefore include sharp corners, flat surfaces, or the like.

With regard to FIG. 8, the roof rail 20 may have a top surface 70 that is generally rounded, and defining an apex 72 thereof. It will be appreciated that the roof rail 20 may have other profile shapes that include an apex. The top surface 70 may have an inner portion 74 and an outer portion 76, which are generally on opposite sides of the apex 72. The access hole 48 of the roof rail may be disposed on the inner portion 74 of the top surface 70.

Accordingly, the apex 72 may be disposed above the access hole 48 in this arrangement. The access hole 48 disposed on the inner portion 74 may therefore face both upwardly and laterally inwardly relative to the vehicle. Thus, access to the stud 28 disposed within the roof rail 20 may be provided both from the top and the side.

In this arrangement, the outer portion 76 extends up to the apex 72, which is disposed higher than the access hole 48. Thus, the outer portion 76 blocks the view of the access hole 48 from the laterally outer side of the roof rail 20.

In the arrangements shown in FIGS. 7 and 8, the access hole 48 is disposed on the inner side of the top surface of the roof rail 20. The structural shapes of the top surface of the roof rail 20 in FIGS. 7 and 8 provide different manners of blocking the access hole 48 from view. In both cases, the access hole 48 is not visible from the laterally outer side of the roof rail due 20 due to the shape of the top surface blocking the view of the access hole 48.

In both cases of FIGS. 7 and 8, the outer portions of the roof rail 20 block the view of the access hole from the laterally outer side of the roof rail 20. Put another way, the user's viewpoint is blocked by the outer portion of the roof rail. The user's viewpoint may be defined generally as the range of view from the highest point of the roof rail 20 down to an angle of about 30 degrees. With the access hole 48 disposed outside of this range of view, the user will typically not see the access hole 48 during normal use, even if it is open.

As described above, the access hole 48 may be covered by a hinged panel or other covering structure. The roof rail 20 may further include other components or covers that ultimately cover the access hole 48 as well as other portions of the roof rail 20.

While the above described roof rails 20 may be used advantageously for top-down installations to eliminate holes in the sheet metal 12 by having an upwardly projecting stud 28, the design of the roof rail 20 may also be used in other top-down arrangements that include holes in the sheet metal 12, or the bottom-up approach. In this case, the roof rail 20 may therefore be used in multiple installation methods, thereby reducing the number and types of roof rails that may be stocked by manufacturers for installation to various vehicles.

The roof rail 20 may be a one-piece design, made of a single component and a single material. The roof rail 20 may also be a multiple-piece design and include the above described features. The multi-piece design may be particularly desirable when the user may desire a modular arrangement allowing for various aesthetic features that can be interchanged. However, the multi-piece design may still benefit from the above-described improved profile, for instance when a particular aesthetic cover is excluded or removed.

The above-described arrangements have described a nut being threaded onto a projecting bolt or stud. However, it will be appreciated that other fastening mechanisms may also be used that may benefit from the above-described profile and access hole location. For instance, a hollow bolt or female bolt may be used instead of a nut and may be threaded or driven down onto the projecting stud 28. Alternatively, a one-way clip or the like may be placed onto a corresponding projecting structure The roof rails 20 of the present disclosure may provide several advantages over designs of the prior art. A roof rail 20 constructed in accordance with the present disclosure may provide for an undisturbed styling surface. A roof rail 20 constructed in accordance with the present disclosure may provide for mounting to the roof 10 of a vehicle without any holes in the sheet metal 12, avoiding a possible source for water leaks. A roof rail 20 constructed in accordance with the present disclosure may provide for mounting to the roof 10 of a vehicle without a stud or other hardware protruding downwardly into the vehicle from the roof 10, thereby avoiding any concern for damage to components or items within the vehicle such as stored or deploying airbags. The roof rails 20 of the present disclosure may also be constructed and/or mounted to the roof 10 of a vehicle using fewer pieces and/or at a decreased cost when compared to designs of the prior art.

Obviously, many modifications and variations of the present disclosure are possible in light of the above teachings and may be practiced otherwise than as specifically described while within the scope of the appended claims.

What is claimed is:

1. A roof rail for a roof of a vehicle, the roof rail comprising:
    a bottom portion for engaging the roof;
    a top portion opposite the bottom portion, and an inboard side portion and an outboard side portion each extending upward from the bottom portion to the top portion and extending generally parallel to one another in a longitudinal direction;
    the bottom portion, the top portion, the inboard side portion, and the outboard side portion defining an elongated shape enclosing an interior space of the roof rail;
    wherein the bottom portion, top portion, inboard side portion, and outboard side portion define a one-piece structure for directly attaching to the roof of the vehicle;
    wherein the elongated shape is defined by a tubular extrusion having a closed cross-section.

2. The roof rail of claim 1 further comprising an access hole disposed lower than an uppermost point of the roof rail to provide access to the interior space for attaching the roof rail to the roof of the vehicle.

3. The roof rail for a vehicle of claim 2, wherein the access hole is disposed on an inner portion of the top portion, and an outer portion of the top portion extends higher than the access hole.

4. The roof rail for a vehicle of claim 2, further including a cover for enclosing the access hole.

5. The roof rail for a vehicle of claim 2, wherein the access hole is defined by the inboard side portion.

6. The roof rail for a vehicle of claim 1, further including a clip for holding the roof rail upon a roof stud or bolt, wherein the clip has a wedge shape being thickest at a first end and tapering to a thinner second end, with the second end defining a notch for receiving the bolt or roof stud.

7. The roof rail of claim 1, wherein the tubular extrusion is plastic.

8. The roof rail of claim 1, wherein the cross-section of the elongated shape is seamless.

9. An attachment apparatus for attaching a roof rail to a roof of a vehicle comprising:
    the roof rail including a bottom portion for engaging the roof, and a top portion opposite the bottom portion, and an inboard side portion and an outboard side portion each extending between the top portion and the bottom portion and spaced apart from one another;
    the bottom portion and the top portion and the inboard side portion and the outboard side portion defining an elongated shape enclosing an interior space of the roof rail;
    wherein the roof rail is a one-piece structure having longitudinally opposite first and second ends;
    a fastener attaching the roof rail to the roof of the vehicle;
    an access hole in the roof rail to provide access to the interior space for attaching the roof rail to the roof of the vehicle, the access hole disposed below an uppermost point of the top portion, wherein the fastener is accessible through the access hole;
    wherein the bottom portion includes downwardly projecting leg portions, wherein the downwardly projecting leg portions are configured to engage the roof of the vehicle and hide the fastener.

10. The attachment apparatus of claim 9, wherein the access hole is disposed inwardly relative to the outboard side portion.

11. The attachment apparatus of claim 9, wherein the bottom portion of the one-piece structure extends from the first end to the second end.

12. The attachment apparatus of claim 9, wherein the fastener is a roof stud extending generally upwardly from the roof of the vehicle.

13. The attachment apparatus of claim 9, wherein the fastener cannot extend through the top portion.

14. The attachment apparatus of claim 9, wherein the fastener includes a bolt extending generally downwardly to the roof of the vehicle.

15. The attachment apparatus of claim 9, wherein the fastener extends transverse to the roof of the vehicle at an oblique angle to the roof of the vehicle.

16. The attachment apparatus of claim 9, wherein the top portion includes a stepped surface including an inner portion and an outer portion, wherein the access hole is disposed on the inner portion, and the outer portion projects above the inner portion.

17. The attachment apparatus of claim 9, wherein the top portion defines an apex, and the access hole is disposed on the inboard side portion.

18. The attachment apparatus of claim 9, wherein the roof of the vehicle defines a pocket configured to receive a portion of the roof rail.

19. The attachment apparatus of claim 9, wherein the roof of the vehicle defines a pocket configured for holding a portion of the fastener.

20. A method of installing a roof rail to a vehicle, the method comprising the steps of:
    placing a roof rail onto a vehicle roof, wherein the roof rail includes a bottom portion, a top portion opposite the bottom portion, and inboard and outboard side portions extending between the bottom portion and the top portion and spaced apart from each other;
    wherein the top portion, the bottom portion, the inboard side portion, and the bottom portion are a one-piece structure that defines an interior space and a seamless closed loop cross-section;
    extending a stud through the bottom portion of the roof rail into the interior space;
    inserting a fastener through an access hole defined by the roof rail and into the interior space defined by the roof rail;
    attaching the fastener to the stud in a top-down direction and securing the roof rail to the vehicle roof.

21. The method of claim 20 wherein the access hole is disposed in the roof rail at a location that is lower than an uppermost point of the roof rail.

22. The method of claim 20, wherein the stud and fastener do not extend through the vehicle roof.

23. The method of claim 20, wherein the fastener and stud remain engaged above the bottom portion and within the interior space when securing the roof rail.

* * * * *